(12) United States Patent
Yoda et al.

(10) Patent No.: US 6,528,718 B2
(45) Date of Patent: Mar. 4, 2003

(54) SOLAR BATTERY MODULE

(75) Inventors: Hiroyuki Yoda, Nara (JP); Akimasa Umemoto, Sakurai (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 09/950,053

(22) Filed: Sep. 12, 2001

(65) Prior Publication Data

US 2002/0029799 A1 Mar. 14, 2002

(30) Foreign Application Priority Data

Sep. 11, 2000 (JP) ........................................ 2000-275155

(51) Int. Cl.⁷ .................... H01L 31/048; H01L 31/02
(52) U.S. Cl. .................... 136/251; 136/244; 136/291; 52/173.3; 257/433
(58) Field of Search ............................... 136/251, 244, 136/291; 52/173.3; 257/433

(56) References Cited

FOREIGN PATENT DOCUMENTS

| JP | 6-136896 A | 5/1994 |
| JP | 9-83005 A | 3/1997 |
| JP | 9-228595 A | 9/1997 |
| JP | 2001-262782 A | * 9/2001 |
| JP | 2001-313409 A | * 11/2001 |

* cited by examiner

*Primary Examiner*—Alan Diamond
(74) *Attorney, Agent, or Firm*—Nixon & Vanderhye, P.C.

(57) ABSTRACT

A solar battery module in use has a solar battery panel and a frame body. The solar battery panel is constituted by laminating a front cover, a filler, a crystal solar battery cell, another filler, and a back cover on one another in this order. The frame body surrounds the outer periphery of the solar battery. At each corner of one side of the frame body is formed a notch with its open end facing toward the light-receiving surface. Under rainfall, rainwater which fell down onto the light-receiving surface flows toward below the solar battery module, and is then held back by the frame member provided on the frame body. The rainwater remaining flows into the notch. In the notch, the rainwater is guided toward above the frame member on the principles of siphon action so as to be discharged out of the solar battery module.

17 Claims, 7 Drawing Sheets

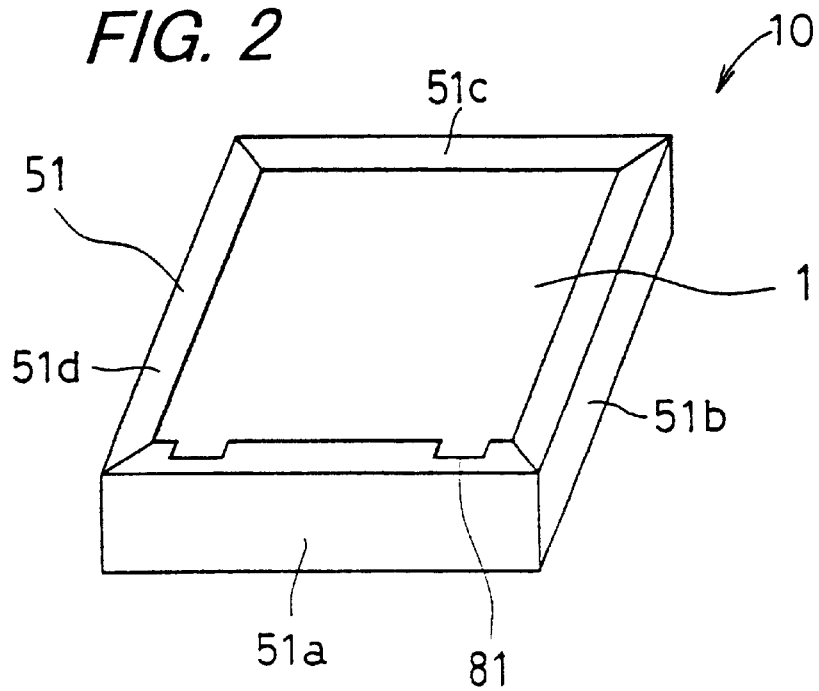
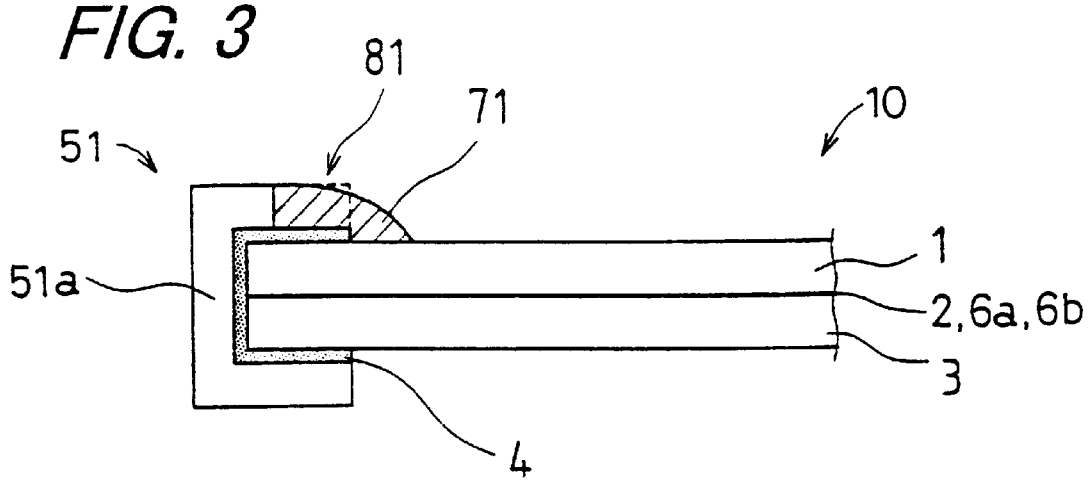

SOLAR BATTERY MODULE

BACKGROUND OF THE INVENTION

1. Field of the Invention

The present invention relates to a solar battery module, and more particularly to a solar battery module which can swiftly discharge a puddle of rainwater collected on its light-receiving side even when placed substantially horizontally.

2. Description of the Related Art

As shown in FIGS. 7 and 8, a solar battery module 100 usually comprises a solar battery panel 108 and a frame body 105. The solar battery panel 108 includes: a front cover 101; a solar battery 102 composed of a plurality of solar battery cells 102a; a back cover 103; and fillers 106a and 106b. The front cover 101 serves to protect the light-receiving-surface side of the solar battery 102. The solar battery 102 for converting sunlight into electricity is composed of a plurality of crystal solar battery cells 102a connected in series. The back cover 103 serves to protect another side of the solar battery 102 opposite to the light-receiving-surface side, i.e., the back-surface side of the solar battery 102. The filler 106a is filled in between the solar battery 102 and the back cover 103. The filler 106b is filled in between the solar battery 102 and the front cover 101. In this way, the solar battery panel 108 is constituted by laminating the front cover 101, the filler 106b, the solar battery 102, the filler 106a, and the back cover 103 on one another in this order. The solar battery panel 108 thus fabricated is given a substantially rectangular shape.

The frame body 105 is composed of a plurality of aluminum-made frame members 105a, 105b, 105c, and 105d, and is attached to the solar battery panel 108 so as to surround its outer edge. The frame members 105a to 105d are each bonded to the outer edge of the solar battery panel 108 with adhesive 104. The watertightness of the solar battery 102 is attained by the use of the fillers 106a and 106b, which are so filled as to sandwich the solar battery 102, and the adhesive 104 used for attachment of the frame members 105a to 105d. The adhesive 104 is made of butyl rubber, expanded EPDM, or silicone resin. Moreover, to improve the watertightness of the solar battery panel 108, a filler 7 is filled in between the outer edge of the front cover 101 and the frame members 105a to 105d.

A solar battery module having such a configuration as described above is usually mounted via a frame member on a platform placed onto a building roof. In order to obtain the maximum electrical generating capacity, an angle at which the solar battery module is mounted (a mounting angle) needs to coincide with the latitude of the placement location. In Japan, the mounting angle is generally set to a range of about 20 to 45 degrees.

Incidentally, there are a wide variety of building roofs. In particular, residential buildings or the like typically employ a roof having a slope, such as a hip roof or gable roof. In a case where the solar battery module is mounted on such a roof, since the mounting angle of the solar battery module is identical with the inclination angle of the roof, in the event of rain, rainwater flows on the light-receiving surface of the solar battery module, and therefore it never occurs that the rainwater remains on the light-receiving surface after the rainfall. On the other hand, factory or public buildings typically employ a flat roof with no slope. Thus, in a case where the solar battery module is mounted on such a flat roof, the solar battery module is mounted substantially horizontally. In this case, it is inevitable that rainwater remains on the light-receiving surface of the solar battery module after the rainfall. For example, it has been confirmed that, even though the height (distance) between the front cover to the top end of the frame member was made as small as 0.7 mm, an about 10 centimeters long puddle of rainwater remained on the solar battery module in the inclination direction thereof.

If rainwater remains on the light-receiving surface of the solar battery module as described above, dirt and dust contained in the air collect in the remains of the rainwater. After the rainwater evaporates, the dirt and dust are deposited on the light-receiving surface. The dirt and dust remaining on the light-receiving surface are generally not rinsed away by subsequently-occurring rainfall. Thus, whenever it rains, dirt and dust accumulate on the light-receiving surface. The increasing accumulation of dirt and dust gradually prevents the light-receiving surface from receiving sunlight, with the result that the amount of light received decreases, and this leads to reduction in the electrical generating capacity.

The above-mentioned problem can be solved by swiftly discharging a puddle of rainwater out of the light-receiving surface. However, in conventional solar battery modules, while due consideration is given to protecting the solar battery module from intrusion of rainwater, no consideration is given to discharging rainwater remaining on the light-receiving surface out of the solar battery module placed horizontally, or substantially horizontally.

SUMMARY OF THE INVENTION

The invention has been made to solve the above problem, and accordingly its object is to provide a solar battery module which is, although being placed horizontally or substantially horizontally, capable of swiftly discharging rainwater from its light-receiving surface after rainfall and maintaining electrical generating capacity of a desired level.

To achieve the above object, the invention provides a solar battery module comprising:

a solar battery panel including a solar battery composed of a plurality of solar battery cells connected in series;

a frame body for surrounding an outer edge of the solar battery panel; and rainwater guiding means, disposed in the frame body, for guiding rainwater collected on a light-receiving surface of the solar battery module to an outside of the frame body.

According to the invention, even if the solar battery module is placed horizontally or substantially horizontally, rainwater collected on the light-receiving surface can be discharged to the outside of the solar battery module by the rainwater guiding means.

In the invention, it is preferable that the rainwater guiding means is constituted by a notch with an open end facing toward the light-receiving surface. In this case, the rainwater collected on the light-receiving surface flows into the notch, overflows the notch to the frame body, and is then guided toward the outer side of the frame body. Thereafter, with this water-guiding effect, the rainwater contained in the notch is guided toward above the frame body on the principles of siphon action. In this way, the rainwater can be discharged out of the solar battery module.

In the invention, it is preferable that the frame body is formed in a substantially rectangular shape and the notch is formed in a corner of the frame body. In this case, even though the solar battery module is diagonally inclined in one direction, the rainwater collected on the light-receiving surface flows into the notch located lowermost, overflows the notch to be guided toward the outer side of the frame body. Thereafter, with this water-guiding effect, the rainwater contained in the notch is guided toward above the frame body on the principles of siphon action. This enables the rainwater to be discharged out of the solar battery module.

In the invention, it is preferable that the notch is covered with a hydrophilic film. In this case, the rainwater which flowed into the notch is guided while being admitted to the hydrophilic film toward above the frame body. This enables the rainwater to be discharged out of the solar battery module.

In the invention, it is preferable that the maximum width of the open end of the notch is set to exist within a range of 1 mm to 5 mm. This makes it possible to prevent intrusion of water into the frame body, to prevent reduction in the torsional strength of the frame body, and to perform the discharge of the rainwater-remaining on the light-receiving surface.

In the invention, it is preferable that the rainwater guiding means is constituted by a slant surface extending from a top surface of the light-receiving surface to a surface of the frame body, the slant surface being formed by filling a water-repellent filler, such as silicone resin, in an outer edge portion of the light-receiving surface. In this case, the rainwater remaining on the light-receiving surface, which flows toward below the solar battery module arranged at an angle, is repelled by the slant surface so as to be guided toward above the frame body. As a result, the rainwater is discharged out of the solar battery module.

In the invention, it is preferable that the slant surface is wholly covered with a hydrophilic film. In this case, the rainwater remaining on the light-receiving surface, which flows toward below the solar battery module arranged at an angle, is admitted to the hydrophilic film so as to be guided toward above the frame body. As a result, the rainwater is discharged out of the solar battery module.

In the invention, it is preferable that the light-receiving surface is formed in a substantially rectangular shape, and the slant surface has a part corresponding to a corner of the light-receiving surface, which part is covered with a hydrophilic film. In this case, even though the solar battery module is diagonally inclined in one direction, the rainwater remaining on the light-receiving surface, which flows toward below the solar battery module arranged at an angle, is admitted to the hydrophilic film covering the lowermost slant surface so as to be guided toward above the frame body. As a result, the rainwater is discharged out of the solar battery module.

As described heretofore, according to the invention, even in a case where the solar battery module is used for an industrial solar electric power generation system which is generally placed horizontally or substantially horizontally, the rainwater remaining on the light-receiving surface can be discharged out of the solar battery module without degrading the strength of the solar battery module. This prevents the rainwater from persistently remaining on the light-receiving surface after rainfall. Thus, it never occurs that dirt and dust contained in the air collect in the rainwater remaining on the light-receiving surface after rainfall. As a result, it is possible to protect the light-receiving surface against deposition of dirt and dust, and to prevent reduction in the electrical generating capacity.

The invention is also suitably applicable to a light transmitting type solar battery module. In that application, since contaminants, such as dirt and dust, deposited on the light-receiving surface are removed, light transmission is facilitated. Thus, not only the electrical generating capacity, but also the appearance is not impaired.

BRIEF DESCRIPTION OF THE DRAWINGS

Other and further objects, features, and advantages of the invention will be more explicit from the following detailed description taken with reference to the drawings wherein:

FIG. 2 is a perspective view schematically illustrating the solar battery module of the first embodiment according to the invention;

FIG. 3 is an enlarged sectional view schematically illustrating the partial structure of the solar battery module of the first embodiment according to the invention;

DETAILED DESCRIPTION OF THE PREFERRED EMBODIMENTS

Figure 1:
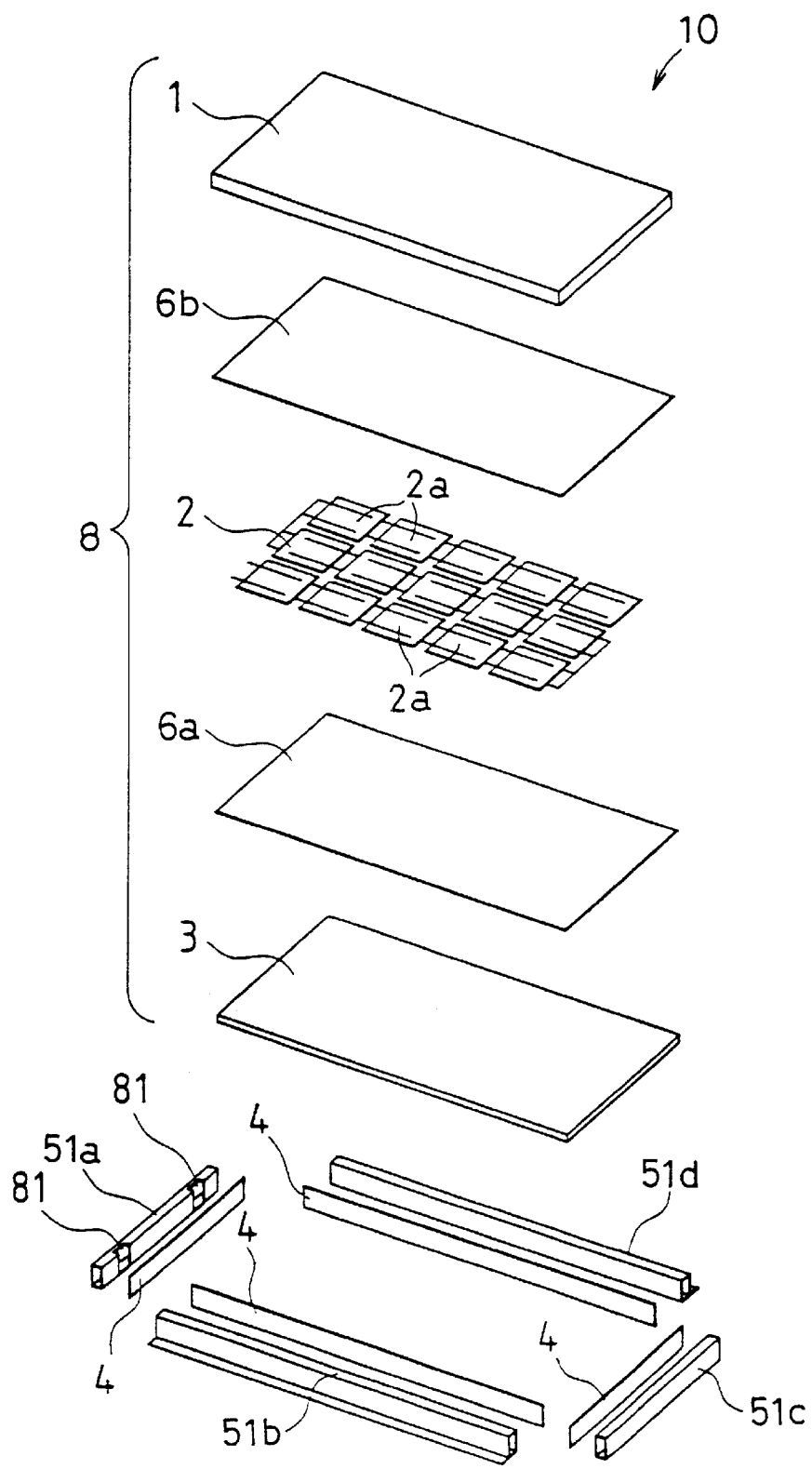
FIG. 1 is an exploded perspective view schematically illustrating a solar battery module of a first embodiment according to the invention.

Now referring to the drawings, preferred embodiments of the invention are described below.

Subsequently-described embodiments deal with the example case where the invention is applied to a crystal solar battery module.

FIG. 1 is an exploded perspective view schematically illustrating a solar battery module 10 of a first embodiment of the invention. The solar battery module 10 comprises a solar battery panel 8 and a frame body 51. The solar battery panel 8 includes: a front cover 1; a solar battery 2 composed of a plurality of solar battery cells 2a; a back cover 3; and fillers 6a and 6b. The front cover 1 serves to protect a light-receiving-surface side of the solar battery 2. The solar battery 2 for converting sunlight into electricity is composed of a plurality of crystal solar battery cells 2a connected in series. The back cover 3 serves to protect another side of the solar battery 2 opposite to the light-receiving-surface side, i.e., a back-surface side thereof. The filler 6a is filled in between the solar battery 2 and the back cover 3. The filler 6b is filled in between the solar battery 2 and the front cover 1. In this way, the solar battery panel 8 is constituted by laminating the front cover 1, the filler 6b, the solar battery 2, the filler 6a, and the back cover 3 on one another in this order. The solar battery panel 8 thus fabricated is given a substantially rectangular shape.

The frame body 51 is composed of a plurality of aluminum-made frame members 51a, 51b, 51c, and 51d. The frame body 51 is attached to the solar battery panel 8 so as to surround its outer edge. The frame members 51a to 51d are each bonded to the outer edge of the solar battery panel 8 with adhesive 4. The watertightness of the solar battery 2 is attained by the use of the fillers 6a and 6b, which are so filled as to sandwich the solar battery 2, and the adhesive 4 used for attachment of the frame members 51a to 51d. The adhesive 4 is made of butyl rubber, expanded EPDM, or silicone resin.

FIG. 2 is a perspective view schematically illustrating the structure of the solar battery module 10 of the first embodiment of the invention. The frame member 51a of the frame body 51 has a notch 81 formed therein that acts as rainwater guiding means. As shown in FIG. 2, the notch 81 is formed at each end of one side, i.e., the frame member 51a, of the frame body 51, and has its open end facing toward the light-receiving surface. The notch 81 does not necessarily have to be formed at this position but may be formed at any given position. Since the notch 81 is formed at each end of the frame member 51a (as described above), even though the solar battery module is diagonally inclined in one direction (due, e.g., to a positional error or warpage occurring in the frame body 51), at least one of the notches 81 is constantly located lowermost. This ensures that the rainwater remaining on the light-receiving surface is discharged out of the solar battery module.

In the notch 81, the maximum width of the open end should preferably be set to exist within a range of 1 mm to 5 mm, more preferably, within a range of 2 mm to 3 mm. With the open end having the maximum width of 2 mm to 3 mm, rainwater can be discharged most efficiently. If the open end has the maximum width of greater than 5 mm, not only the torsional strength of the frame member 51a decreases, but also the solar battery module suffers from intrusion of rainwater. By contrast, if the open end has the maximum width of less than 1 mm, dirt or dust tends to find its way into the notch 81, with the result that the notch 81 no longer functions as rainwater guiding means.

Next, with reference to FIG. 3, explanation will be given below as to the effect attained by using the notch 81 as rainwater guiding means. Note that FIG. 3 is an enlarged sectional view schematically illustrating part of the structure of the solar battery module 10 of the first embodiment of the invention, particularly, the notch 81 and its vicinity.

Rainwater which falls down onto the light-receiving surface flows along the front cover 1 of the solar battery module (which slopes at an angle of about two degrees) toward frame member 51a, and is then held back by the frame member 51a provided on the lower side of the frame body 51. The remaining rainwater 71 flows into the notch 81. The rainwater 71 which reaches the notch 81 then overflows the notch 81 to cross over the frame member 51a, and is guided toward the outer side of the frame body 51. Thereafter, with this water-guiding effect, the rainwater contained in the notch 81 is guided over the frame body 51 in accordance with the principle of siphon action, and is eventually discharged out of the solar battery module. Once allowed to flow, the rainwater 71 remaining on the light-receiving surface is guided through the notch 81 and over the frame body 51 in streaming fashion, so that no rainwater remains on the light-receiving surface after the rainfall.

Figure 4A:
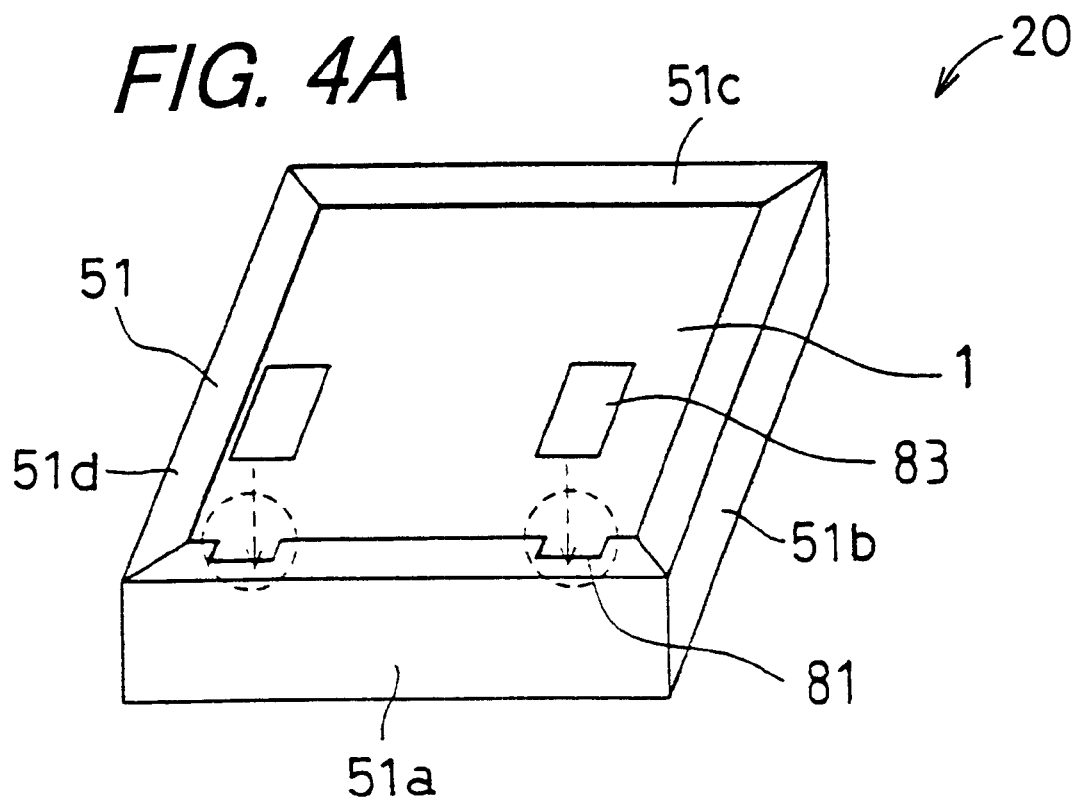
FIG. 4A is a perspective view schematically illustrating a solar battery module of a second embodiment according to the invention.
Figure 4B:
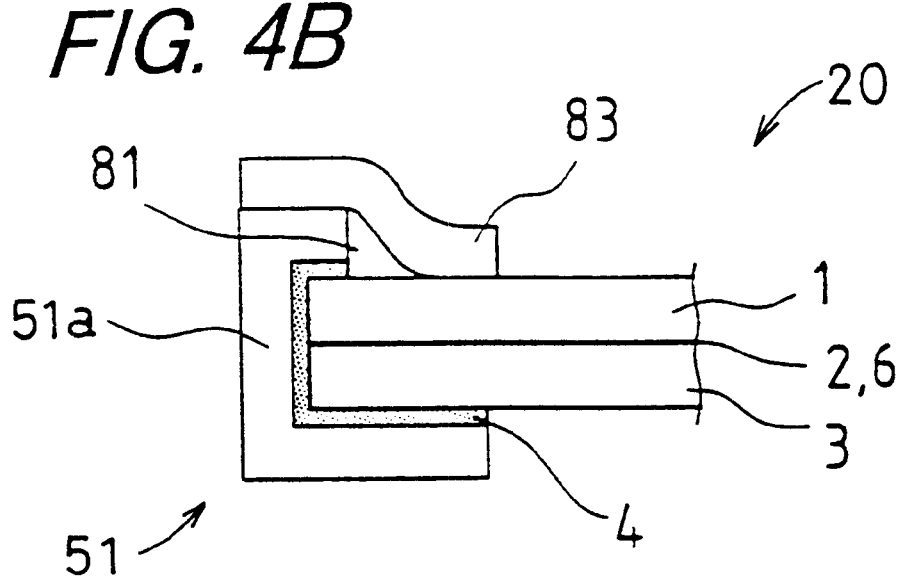
FIG. 4B is an enlarged sectional view schematically illustrating the partial structure of the solar battery module of the second embodiment according to the invention.

FIGS. 4A and 4B schematically illustrate the structure of a solar battery module 20 of a second embodiment of the invention. In this embodiment, the rainwater guiding means is not limited to the above stated notch 81 but may be constituted by covering the notch 81 with a hydrophilic film 83, as shown in FIG. 4A. The hydrophilic film 83 may be of, for example, a $TiO_2$ film, but is not limited thereto. As shown in FIGS. 4A and 4B, the hydrophilic film 83 is shaped like a strip having a width slightly narrower than the opening width of the notch 81. The hydrophilic film 83 has one of its ends bonded to the light-receiving surface with a suitable adhesive, and has the other of its ends bonded to the top surface of the frame member 51a in a similar manner.

Rainwater which falls down onto the light-receiving surface flows along the front cover 1 of the solar battery module (which slopes at an angle of about two degrees) toward frame member 51a, and is then held back by the frame member 51a provided on the lower side of the frame body 51. The remaining rainwater flows into the notch 81 and is immediately admitted to the hydrophilic film 83. In the notch 81, the water-guiding effect based on the principles of siphon action are enhanced by the hydrophilic film 83, and therefore the rainwater admitted to the film is guided over the frame member 51a more swiftly than in a case where only the notch 81 is provided. As a result, once admitted to the film, the rainwater remaining on the light-receiving surface is guided over the frame member 51a in streaming fashion, so that a puddle of rainwater is discharged more swiftly than in a case where only the notch 81 is provided.

Although, in the Figure, the notch 81 is provided only on one side, i.e., the frame member 51a, of the frame body 51, it may be provided in each of the frame members 51a to 51d. Moreover, the notch 81 does not necessarily have to be formed at each end of the frame member 51a.

Figure 5A:
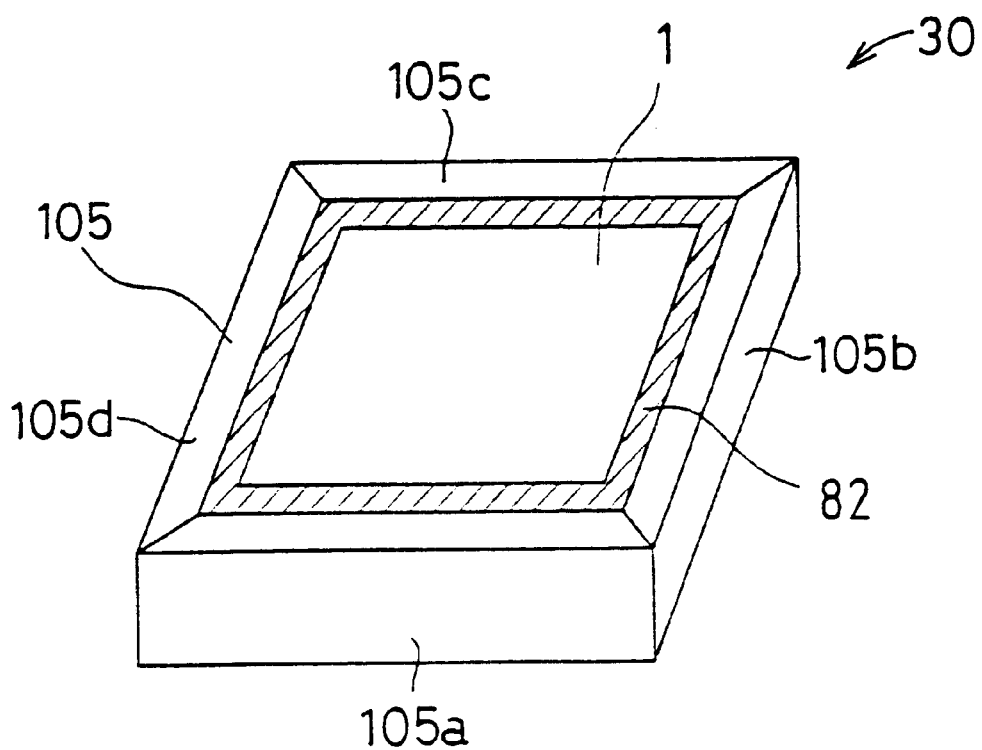
FIG. 5A is a perspective view schematically illustrating a solar battery module of a third embodiment according to the invention.
Figure 5B:
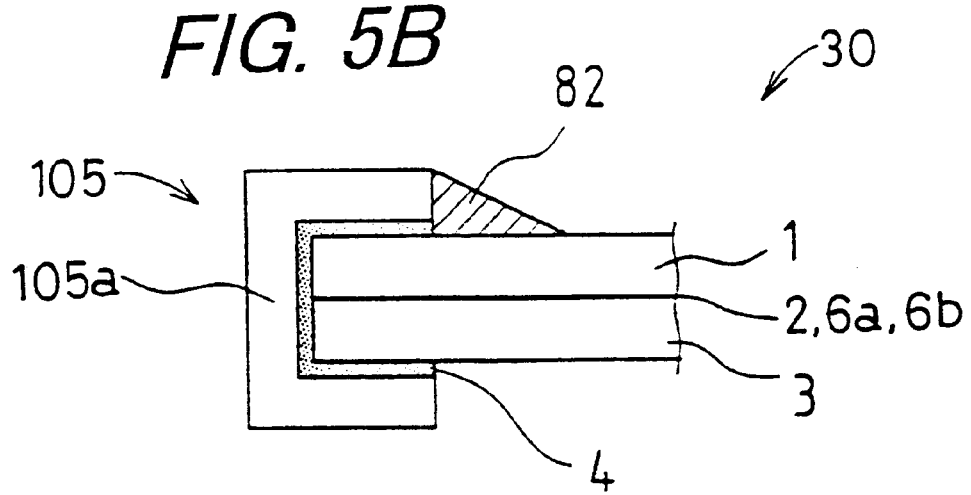
FIG. 5B is an enlarged sectional view schematically illustrating the partial structure of the solar battery module of the third embodiment according to the invention.

A solar battery module 30 of a third embodiment of the invention has basically the same structure as the solar battery module 10 of the first embodiment, the only difference being the configurations of the rainwater guiding means and the frame body. Therefore, in the following descriptions, such elements as are found also in the first embodiment described earlier are identified with the same reference numerals and symbols, and overlapping descriptions will be omitted. Note that the configuration of the frame body of this embodiment is identical with that of the conventional frame body 105, and therefore no description will be given. Now, with reference to FIGS. 5A and 5B, the rainwater guiding means will be described in detail. FIG. 5A is a perspective view schematically illustrating the structure of the solar battery module 30 of the third embodiment of the invention. FIG. 5B is an enlarged sectional view schematically illustrating part of the solar battery module 30 of the third embodiment of the invention, particularly the structure of the frame member 105a and its vicinity.

In this embodiment, the rainwater guiding means comprises a slant surface extending from the top surface of the light-receiving surface to the surfaces of the frame members 105a to 105d constituting the frame body 105, the slant surface being comprised by filling a water-repellent filler in an outer edge portion of the light-receiving surface. Silicone resin is taken as an example of such a water-repellent filler. Specifically, the silicone resin is filled in the outer edge portion of the light-receiving surface, and the surface of the resin is treated in such a way as to form a slant surface extending from the top surface of the light-receiving surface to the surfaces of the frame members 105a to 105d, thereby comprising the rainwater guiding means.

Rainwater which falls down onto the light-receiving surface flows downstream in the inclination direction of the solar battery module (at an angle of about two degrees)

toward frame member 105a, and is then held back by the frame member 105a through the slant surface 82. Immediately thereafter, the rainwater is repelled by the slant surface 82 so as to be guided over the frame member 105a, and is eventually discharged out of the solar battery module. As a result, no rainwater remains on the light-receiving surface after the rainfall.

Figure 6:
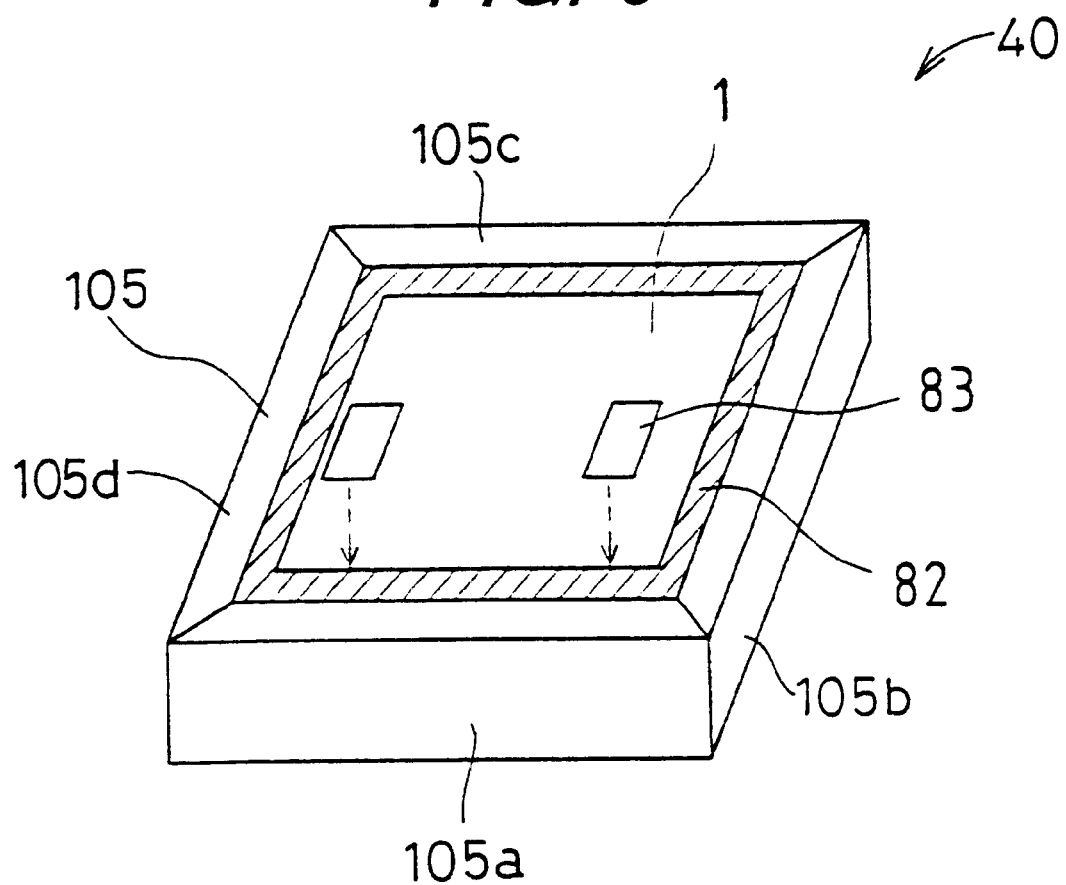
FIG. 6 is a perspective view schematically illustrating a solar battery module of a fourth embodiment according to the invention.
Figure 7:
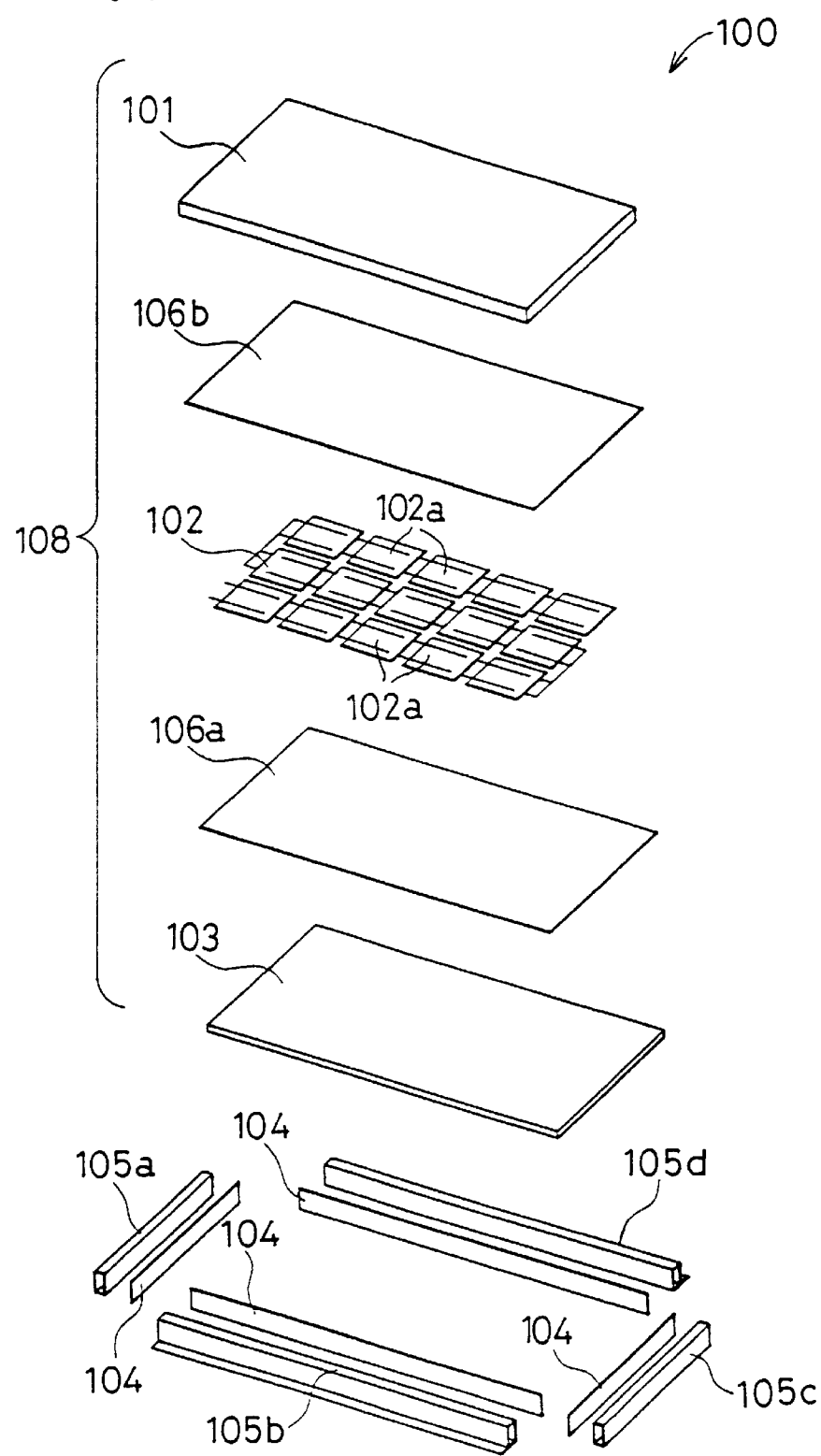
FIG. 7 is an exploded perspective view schematically illustrating a conventional solar battery module.
Figure 8:
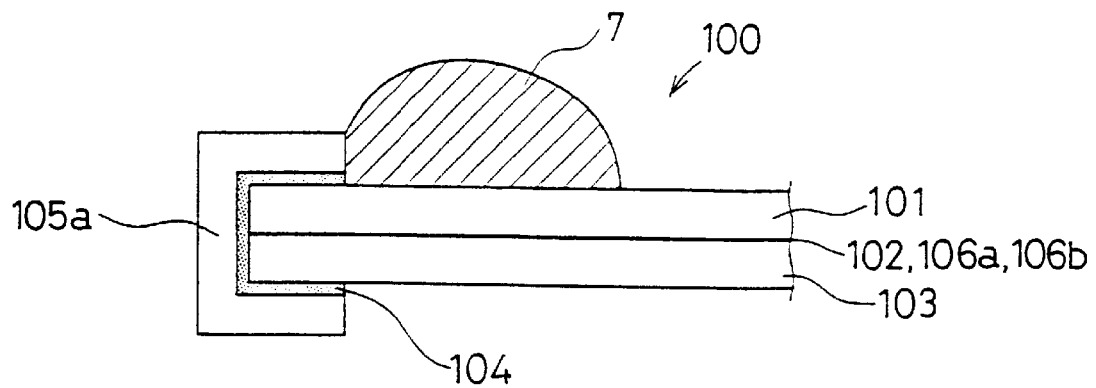
FIG. 8 is an enlarged sectional view schematically illustrating the partial structure of the conventional solar battery module.

FIG. 6 is a perspective view schematically illustrating the structure of a solar battery module 40 of a fourth embodiment of the invention. In the above-described embodiment, the rainwater guiding means comprises the slant surface 82 exhibiting water repellency. However, the rainwater guiding means is not limited to this configuration, but may be of another configuration such as described in the second embodiment in which the slant surface 82 is partly covered with the hydrophilic film 83. Specifically, as shown in FIG. 6, the frame body 105 has, in a position near each end of its one side, i.e., the frame member 105a, the strip-like hydrophilic film 83 stuck with a suitable adhesive. The length of the hydrophilic film 83 is made substantially equal to the width (the length in the inclination direction) of the slant surface 82 (the hydrophilic film 83 has one of its ends bonded to the top surface of the frame member 105a with a suitable adhesive). Note that the hydrophilic film 83 does not necessarily have to be attached to the above-described position but may be attached to any given position. Since the hydrophilic film 83 is attached to a position near each end of one side, i.e., the frame member 105a, of the frame body 105, even though the solar battery module is diagonally inclined in one direction (due, e.g., to a positional error or warpage occurring in the frame body 105), at least one of the hydrophilic films 83 is constantly located lowermost. This ensures that the rainwater remaining on the light-receiving surface is discharged out of the solar battery module.

Rainwater which falls onto the light-receiving surface flows along the front cover 1 of the solar battery module (at an angle of about two degrees) toward frame member 105a, and is then held back by the frame member 105a provided on the lower side of the frame body 105. When the solar battery module is diagonally inclined in one direction, the rainwater remaining on the light-receiving surface is held back by the corner of the frame body 105 located lowermost. Since the slant surface 82 is formed in the outer edge portion of the light-receiving surface, the rainwater remaining flows into the slant surface 82 covered with the hydrophilic film 83 so as to be admitted to the hydrophilic film 83. The rainwater admitted thereto is guided over the frame member 105a in accordance with the principles of siphon action, and is eventually discharged out of the solar battery module. Once admitted to the film, the rainwater remaining on the light-receiving surface is guided over the frame member 105a in streaming fashion, so that a puddle of rainwater is discharged more swiftly than in a case where only the slant surface 82 is provided.

Although this embodiment deals with the case where the slant surface has a certain part thereof (e.g., each corner of the lower portion of the outer edge of the rectangular-shaped light-receiving surface) covered with a hydrophilic film, the entire surface of the slant surface may be covered with the hydrophilic film.

Moreover, the invention is applicable not only to the crystal solar battery modules corresponding to the embodiments but also to a thin-film solar battery module of an integrated type, a solar battery module of a lighting type, or any other differently-shaped solar battery module.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and the range of equivalency of the claims are therefore intended to be embraced therein.

What is claimed is:

1. A solar battery module comprising:
   a solar battery panel including a solar battery comprised of a plurality of solar battery cells;
   a frame body for surrounding an outer edge of the solar battery panel; and
   rainwater guiding means disposed in the frame body for guiding rainwater collected on a light-receiving surface of the solar battery module to an outside of the frame body;
   wherein the rainwater guiding means is constituted by a notch with an open end facing toward the light-receiving surface, the notch extending only partially across the frame body in a direction from the light-receiving surface to the outside of the frame body.

2. The solar battery module of claim 1,
   wherein the frame body is formed in a substantially rectangular shape and the notch is formed in a corner of the frame body.

3. The solar battery module of claim 2,
   wherein a maximum width of the open end of the notch is set to exist within a range of 1 mm to 5 mm.

4. The solar battery module of claim 2,
   wherein the notch is covered with a hydrophilic film.

5. The solar battery module of claim 3,
   wherein the notch is covered with a hydrophilic film.

6. A solar battery module comprising:
   a solar battery panel including a solar battery comprised of a plurality of solar battery cells;
   a frame body for surrounding an outer edge of the solar battery panel; and
   rainwater guiding means disposed in the frame body for guiding rainwater collected on a light-receiving surface of the solar battery module to an outside of the frame body, the rainwater guiding means comprising a notch with an open end facing toward the light-receiving surface;
   wherein the notch is covered with a hydrophilic film.

7. The solar battery module of claim 6,
   wherein the frame body is formed in a substantially rectangular shape and the notch is formed in a corner of the frame body.

8. The solar battery module of claim 6,
   wherein a maximum width of the open end of the notch is in a range of 1 mm to 5 mm.

9. A solar battery module comprising:
   a solar battery panel including a solar battery comprised of a plurality of solar battery cells;
   a frame body for surrounding an outer edge of the solar battery panel; and rainwater guiding means disposed in the frame body for guiding rainwater collected on a light-receiving surface of the solar battery module to an outside of the frame body, the rainwater guiding means comprising a slant surface extending from a top surface of the light-receiving surface to a surface of the frame body, the slant surface comprising a water-repellent filler in an outer edge portion of the light-receiving surface;

wherein the slant surface is essentially wholly covered with a hydrophilic film.

10. A solar battery module comprising:

a solar battery panel including a solar battery comprised of a plurality of solar battery cells;

a frame body for surrounding an outer edge of the solar battery panel; and rainwater guiding means disposed in the frame body for guiding rainwater collected on a light-receiving surface of the solar battery module to an outside of the frame body, the rainwater guiding means comprising a slant surface extending from a top surface of the light-receiving surface to a surface of the frame body, the slant surface comprising a water-repellent filler in an outer edge portion of the light-receiving surface;

wherein the light-receiving surface is formed in a substantially rectangular shape, and wherein the slant surface has a slant surface corner which is covered with a hydrophilic film.

11. A solar battery module comprising:

a solar battery panel including a solar battery comprised of a plurality of solar battery cells;

a frame body for surrounding an outer edge of the solar battery panel; and rainwater guiding means disposed in the frame body for siphoning rainwater collected on a light-receiving surface of the solar battery module over the frame body and away from the light-receiving surface.

12. The solar battery module of claim 11, wherein the frame body surrounding the outer edge of the solar battery panel has an essentially uniform height.

13. The solar battery module of claim 11, wherein the frame body surrounding the outer edge of the solar battery panel is provided with a notch, the notch having an open end facing toward the light-receiving surface, and wherein a hydrophilic film is provided proximate the notch.

14. The solar battery module of claim 11, wherein the rainwater guiding means comprises a hydrophilic film which siphons rainwater over the frame body.

15. The solar battery module of claim 11, wherein the rainwater guiding means comprises a slant surface extending from a top surface of the light-receiving surface to a surface of the frame body.

16. The solar battery module of claim 15, wherein the slant surface is at least partially covered with a hydrophilic film.

17. The solar battery module of claim 15, wherein the notch extends only partially across the frame body in a direction from the light-receiving surface to the outside of the frame body.

* * * * *